No. 670,922. Patented Mar. 26, 1901.
J. MARQUARDT.
EXPANDING CLAMP.
(Application filed Oct. 12, 1900.)
(No Model.)
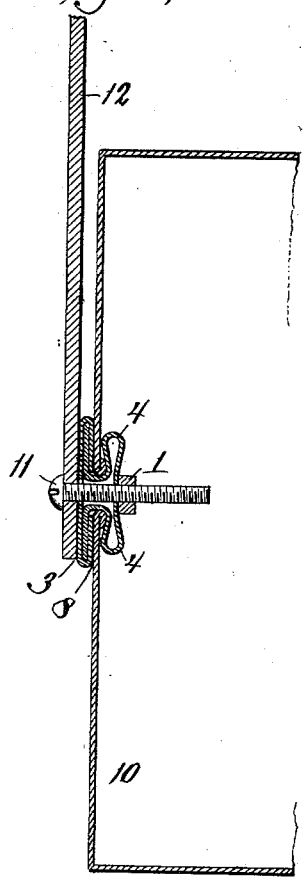
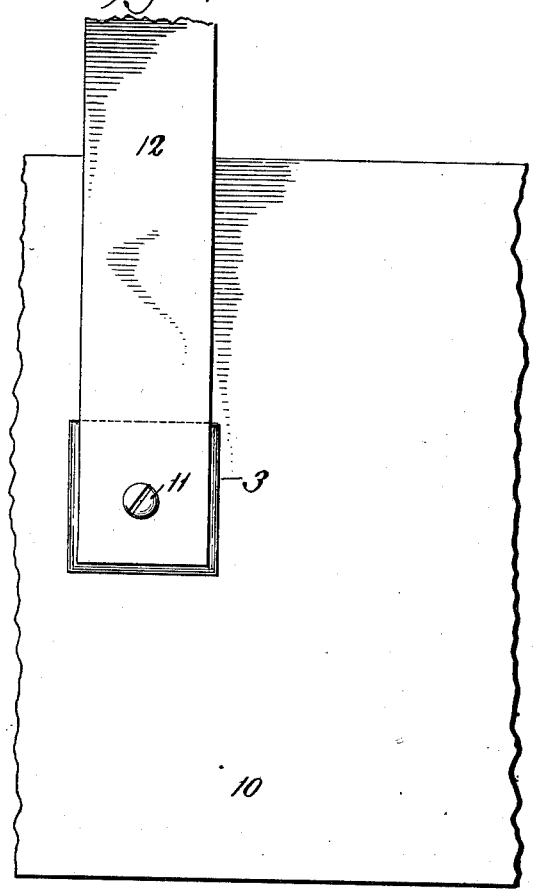
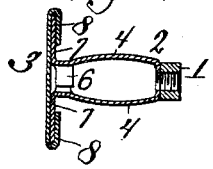
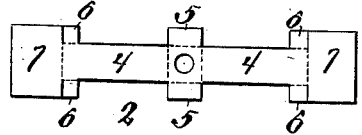
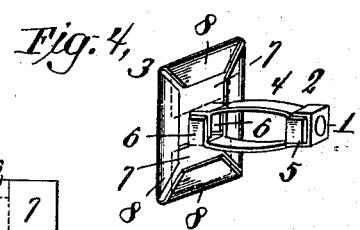
WITNESSES:
INVENTOR
Joseph Marquardt
BY
Henry D. Williams
ATTORNEY

UNITED STATES PATENT OFFICE.

JOSEPH MARQUARDT, OF NEW YORK, N. Y.

EXPANDING CLAMP.

SPECIFICATION forming part of Letters Patent No. 670,922, dated March 26, 1901.

Application filed October 12, 1900. Serial No. 32,840. (No model.)

*To all whom it may concern:*

Be it known that I, JOSEPH MARQUARDT, a citizen of the United States, and a resident of the borough of Manhattan, county of New York, city and State of New York, have invented certain new and useful Improvements in Expanding Clamps, of which the following is a specification, reference being had to the accompanying drawings, forming part hereof.

My invention relates to expanding clamps, and is embodied in a device adapted to clamp itself to an object of sheet metal or other thin or weak material to provide thereupon a socket for any desired purpose.

A device embodying my invention is particularly adapted for attachment to sheet-metal pipes or flues, as it can be inserted from the outside of the pipe or flue and clamped against the inner surface thereof without other access to the interior of the pipe or flue and will provide a socket held against the interior of the pipe or flue, which socket may receive a screw or bolt for fastening a support or hanger or other device to the pipe or flue.

My invention includes several improvements in such clamps, all of which will now be particularly described with reference to the accompanying drawings.

Figure 1 is a side elevation showing a portion of a large sheet-metal pipe containing expanded therein a clamp embodying my invention and secured to a support or hanger thereby. Fig. 2 is a section of the same on a vertical plane through the center of the clamp. Fig. 3 is a similar section of the clamp before expansion. Fig. 4 is a perspective view of the same. Fig. 5 is a face view of the blank, which is shaped up to form the expanding arms and other portions of the clamp.

The expanding clamp comprises a head, a socket, and an expanding part joining the head and socket. The expanding part is made of substantially inelastic material, so that after it has been expanded it will retain the position or shape to which it has been expanded and will thus itself clamp against the object, permitting the means whereby the expanding operation was effected to be withdrawn. Thus the socket may be primarily used for engagement with the expanding means, and after the completion of that operation the expanding means may be disengaged from the socket and withdrawn and the object to which the expanding clamp has been secured will be provided with a socket firmly held thereon and capable of any desired use.

In the construction shown the clamp is made of three pieces—a flat-sided thick metal piece 1, perforated and internally threaded, which may be a square nut and which forms the socket, and two sheet-metal pieces, the arm-piece 2 and the head-piece 3. The sheet-metal arm-piece 2 is of substantially inelastic or soft brass or other substantially inelastic metal, the flat blank of which is shown in Fig. 5, with the lines of folding or bending indicated by dotted lines, and includes the expanding arms 4 4, which are bent forwardly so as to be substantially parallel to each other, leaving a flat part between and substantially at right angles to them, which flat part bears against the front face of the nut or socket 1, and this arm-piece 2 also includes the lugs 5 5, which are bent rearwardly, so as to bear against the sides of the nut or socket 1, and includes the front lugs 6 6, which are bent substantially at right angles to the expanding arms and at right angles to the head, so as to overlap and form a rectangular bushing within the opening in which the clamp is placed, and also includes flanges 7 7, which are bent substantially at right angles to the expanding arms and parallel to the head. The sheet-metal head-piece 3 forms the outer portion of the head and is provided with flaps 8 8, which are bent inwardly and substantially parallel to the head, so as to cover and grip the flanges 7 7 of the arm-piece, and is perforated in line with the threaded opening in the socket 1, so as to freely admit a screw, which will engage with the threads of the socket. The portion of the arm-piece 2 which rests against the front face of the socket 1 is perforated to correspond with the perforation of the socket and is secured to the face of the socket 1, preferably by solder, and the rear lugs 5 5 are secured to the sides of the socket 1, preferably by solder. The overlapping front lugs 6 6 may be soldered together, and the flanges 7 7 may be secured to the head by solder, if desired, but will be sufficiently held together in many cases without soldering or other fastening.

To attach my improved clamp as above described to a sheet-metal pipe, such as the pipe 10, (partly shown,) it is only necessary to make a hole in the pipe sufficiently large to admit the nut or socket 1 and insert the clamp therein, with its head 3 resting against the outer surface of the pipe, and to insert a screw, such as the screw 11, into the opening in the clamp and to turn the screw so that it will engage with and enter the socket 1 and then draw the socket 1 forwardly, forcing the expanding arms 4 4 outwardly and forwardly until the socket comes squarely against the front of the clamp, in which position the expanding arms will bear tightly against the inner face of the pipe, as shown in Fig. 2. When it is desired to fasten a suspending-piece, as the flat metal bar 12, to the pipe, the screw 11 may be passed through a perforation in the bar before it enters the clamp, and with such procedure all parts would occupy the position shown in Fig. 2 at the conclusion of the expanding operation just described. The expanding operation may be performed first with a screw sufficiently long to reach the socket before expansion of the clamp, and this long screw may be withdrawn and a shorter screw used for fastening the suspending-piece or other device to the clamp.

It will be seen that according to my invention a sheet-metal piece or other object may be provided with a socket firmly secured thereto without other access to the interior of the pipe or object than through the hole formed to receive the clamp. It frequently happens that one or more thicknesses of insulating or other material cover the outer surface of such pipe, and I propose to provide clamps with longer bushings formed by longer front lugs 6 6 and to insert the clamp directly through all thicknesses of material, with the head 3 resting against the outer surface of the outer layer. Usually when the hole is formed in the sheet metal the edges will be burred inward, as shown in Fig. 2; but the expanding arms will readily bend outwardly and forwardly around these burs and only clamp more tightly by reason thereof.

The expanding arms 4 4 are shown as bowed slightly outwardly to insure an outward movement when the socket 1 is drawn up. They may be slightly angularly bent or medially creased and may in some instances be nearly or quite straight.

It is evident that various modifications may be made in the construction above particularly described within the purview of my invention.

What I claim as my invention, and desire to secure by Letters Patent, is—

1. An expanding clamp comprising a head, a socket, and an expanding part of substantially inelastic material joining the head and socket, substantially as set forth.

2. An expanding clamp comprising a head, a threaded socket and expanding arms of substantially inelastic material joining the head and socket, substantially as set forth.

3. An expanding clamp comprising a socket constructed to be inserted through an opening in the object against which it is to be clamped, a head constructed to bear against the object about the opening and perforated so as to freely admit a fastening device which will engage the socket, and an expanding part of substantially inelastic material joining the head and socket and constructed to enter the opening when not expanded and when expanded to bear against the side of the object opposite that against which the head bears, substantially as set forth.

4. An expanding clamp comprising a head, a socket and substantially inelastic sheet-metal expanding arms, said arms being secured to the head and socket and joining the head and socket, substantially as set forth.

5. An expanding clamp comprising a socket, a head, and a sheet-metal arm-piece, said arm-piece being secured to said socket and having substantially inelastic expanding arms and being secured to said head, substantially as set forth.

6. An expanding clamp comprising a socket, a sheet-metal head-piece, and a sheet-metal arm-piece, said arm-piece being secured to said socket and having substantially inelastic expanding arms and forming a bushing in proximity to said head-piece and being secured to said head-piece, substantially as set forth.

7. An expanding clamp comprising the threaded socket 1, the sheet-metal arm-piece 2 having lugs 5, 5, and secured to said threaded socket 1, and having the expanding arms 4, 4, and front lugs 6, 6, said lugs forming a bushing, and a head, said arm-piece being secured to said head, substantially as set forth.

8. An expanding clamp comprising the threaded socket 1, the sheet-metal arm-piece having rear lugs 5, 5, and secured to said threaded socket 1, and having expanding arms 4, 4, and front lugs 6, 6, said lugs forming a bushing, and having the flanges 7, 7, and the sheet-metal head-piece 3 having flaps 8, 8, closed over said flanges, substantially as set forth.

Signed at the borough of Manhattan, county of New York, city of New York, and State of New York, this 8th day of October, 1900.

JOSEPH MARQUARDT.

Witnesses:
HENRY D. WILLIAMS,
HERBERT H. GIBBS.